United States Patent
Celli

(10) Patent No.: US 10,626,954 B2
(45) Date of Patent: Apr. 21, 2020

(54) MANUAL TRANSMISSION

(71) Applicant: GM Global Technology Operations LLC, Detroit, MI (US)

(72) Inventor: Cleber Augusto Celli, Warwick (GB)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 897 days.

(21) Appl. No.: 15/190,951

(22) Filed: Jun. 23, 2016

(65) Prior Publication Data

US 2017/0059005 A1    Mar. 2, 2017

Related U.S. Application Data

(60) Provisional application No. 62/209,126, filed on Aug. 24, 2015.

(51) Int. Cl.
  *F16H 57/021*  (2012.01)
  *F16H 3/089*  (2006.01)
  *F16H 57/031*  (2012.01)

(52) U.S. Cl.
  CPC ........... *F16H 3/089* (2013.01); *F16H 57/021* (2013.01); *F16H 57/031* (2013.01); *F16H 2200/0052* (2013.01)

(58) Field of Classification Search
  CPC ...... F16H 3/089; F16H 57/021; F16H 57/031; F16H 2200/0052
  USPC ............................................ 74/325; 384/535
  See application file for complete search history.

(56) References Cited

U.S. PATENT DOCUMENTS

| | | | | |
|---|---|---|---|---|
| 2,992,868 A * | 7/1961 | Vacha | ..................... | F16C 27/04 384/617 |
| 3,372,963 A * | 3/1968 | Harris | ..................... | F16B 21/18 384/537 |
| 6,155,125 A * | 12/2000 | Negherbon | ........... | F16H 3/0915 74/325 |
| 7,059,210 B2 * | 6/2006 | Thiessen | ............... | F16H 3/0915 74/337.5 |
| 7,581,467 B2 * | 9/2009 | Peterman | ................ | F16H 63/18 74/473.37 |

FOREIGN PATENT DOCUMENTS

| | | |
|---|---|---|
| CN | 104728358 A | 6/2015 |
| DE | 4116418 C1 | 12/1992 |
| DE | 102008001398 A1 | 10/2009 |
| DE | 102009004588 A1 | 7/2010 |
| EP | 0 393 246 * | 10/1990 |
| EP | 0 710 786 * | 5/1996 |
| FR | 2726623 A1 | 5/1996 |

* cited by examiner

*Primary Examiner* — William C Joyce

(57) ABSTRACT

A transmission includes a transmission housing, six coplanar gear sets, a transmission input member, an output member, and three synchronizer assemblies. The three synchronizer assemblies are selectively engaged to establish one of at least six forward speed ratios and one reverse speed ratio between the transmission input shaft member and the output member. A structural transmission cover supports the input and output members on one end and encloses two of the six coplanar gear sets.

5 Claims, 4 Drawing Sheets

MANUAL TRANSMISSION

CROSS REFERENCE TO RELATED APPLICATIONS

This application claims benefit of U.S. Provisional Application No. 62/209,126 filed Aug. 24, 2015. The disclosure of the above application is incorporated herein by reference.

TECHNICAL FIELD

The present disclosure relates to transmissions and more particularly to a compact, manual transmission having two axes to establish at least six gear speeds and a reverse gear speed.

BACKGROUND

The statements in this section merely provide background information related to the present disclosure and may or may not constitute prior art.

A typical multiple speed transmission having countershafts and coplanar gear sets uses countershaft gears with a different, dedicated gear pair or set to achieve each forward speed ratio. Accordingly, the total number of gears required in this typical design is two times the number of forward speeds, plus three for reverse. This necessitates a large number of required gear pairs, especially in transmissions that have a relatively large number of forward speed ratios.

While current transmissions achieve their intended purpose, the need for new and improved transmission configurations which exhibit improved performance, especially from the standpoints of efficiency, responsiveness and smoothness and improved packaging, primarily reduced size and weight, is essentially constant. Accordingly, there is a need in the art for a transmission having improved packaging while providing desirable gear ratios and torque ranges.

SUMMARY

A manual transmission is provided in an aspect of the present invention. The transmission includes an input member, an output member, six coplanar gear sets, three torque transmitting devices, and a transmission housing. More particularly, the output member of the transmission is parallel to the input member. Each of the six coplanar gear sets have a first gear intermeshing with a second gear. Each of the first gears of the six coplanar gear sets are fixed for common rotation with the input member. Each of the second gears of the six coplanar gear sets are selectively coupled to the output member. A first two-way synchronizer selectively connects one of the second gear of the first coplanar gear set and the second gear of the second coplanar gear set with the output member. A second two-way synchronizer selectively connects one of the second gear of the third coplanar gear set and the second gear of the fourth coplanar gear set with the output member. A third two-way synchronizer for selectively connects one of the second gear of the fifth coplanar gear set and the second gear of the sixth coplanar gear set with the output member. The transmission housing at least partially supports the input and output members. To achieve one of six forward gear ratios, one of the first, second, and third torque transmitting devices is activated to connect one of the second gears of the six coplanar gear sets for common rotation with the output member.

In one aspect of the present invention, the transmission includes a structural transmission cover fixed to the transmission housing. The structural transmission cover rotatably supports a portion of the input and output members.

In another aspect of the present invention, the input member and output member each has a first end, a middle portion, and a second end. The first end of the each of the input member and the output member is rotatably supported by the transmission housing. The second end of the input member and output member are rotatably supported by the structural transmission cover.

In yet another aspect of the present invention, the transmission housing rotatably supports the first end of the input member via a first bearing, the first end of the output member via a second bearing, the middle portion of the input member via a third bearing, and the middle portion of the output member via a fourth bearing.

In yet another aspect of the present invention, the structural transmission cover rotatably supports the second end of the input member via a fifth bearing and the second end of the output member via a sixth bearing.

In yet another aspect of the present invention, the selective engagement of the second gears of the first, second, third, and fourth coplanar gear sets provide the first, second, third, and fourth forward gear ratios and each of the first, second, third, and fourth coplanar gear sets are enclosed by the transmission housing.

In yet another aspect of the present invention, the selective engagement of the second gears of the fifth and sixth coplanar gear sets provide the fifth and sixth forward gear ratios and each of the fifth and sixth coplanar gear sets are enclosed by the structural transmission cover.

In yet another aspect of the present invention, the fourth coplanar gear set is disposed proximate the first end of the input and output members and the first coplanar gear set is disposed proximate the middle portion of the input and output members.

In yet another aspect of the present invention, the transmission housing includes a mounting flange, and wherein the mounting flange supports the third and fourth bearings, and the fifth coplanar gear set is disposed adjacent to the mounting flange.

In yet another aspect of the present invention, the structural transmission cover includes a seal groove, a plurality of fastener bosses, and a first and second bearing support portions, and wherein the fifth and sixth bearings are disposed in the first and second bearing support portions, respectively.

In yet another aspect of the present invention, the transmission further includes a synchronizer shift mechanism having a shift rod and a shift fork. The synchronizer shift mechanism activates the third two-way synchronizer. The shift fork includes a pivot bracket fixed to the mounting flange of the transmission housing.

Further aspects, examples, and advantages of the invention will become apparent by reference to the following description and appended drawings wherein like reference numbers refer to the same component, element or feature.

DESCRIPTION

Figure 1:
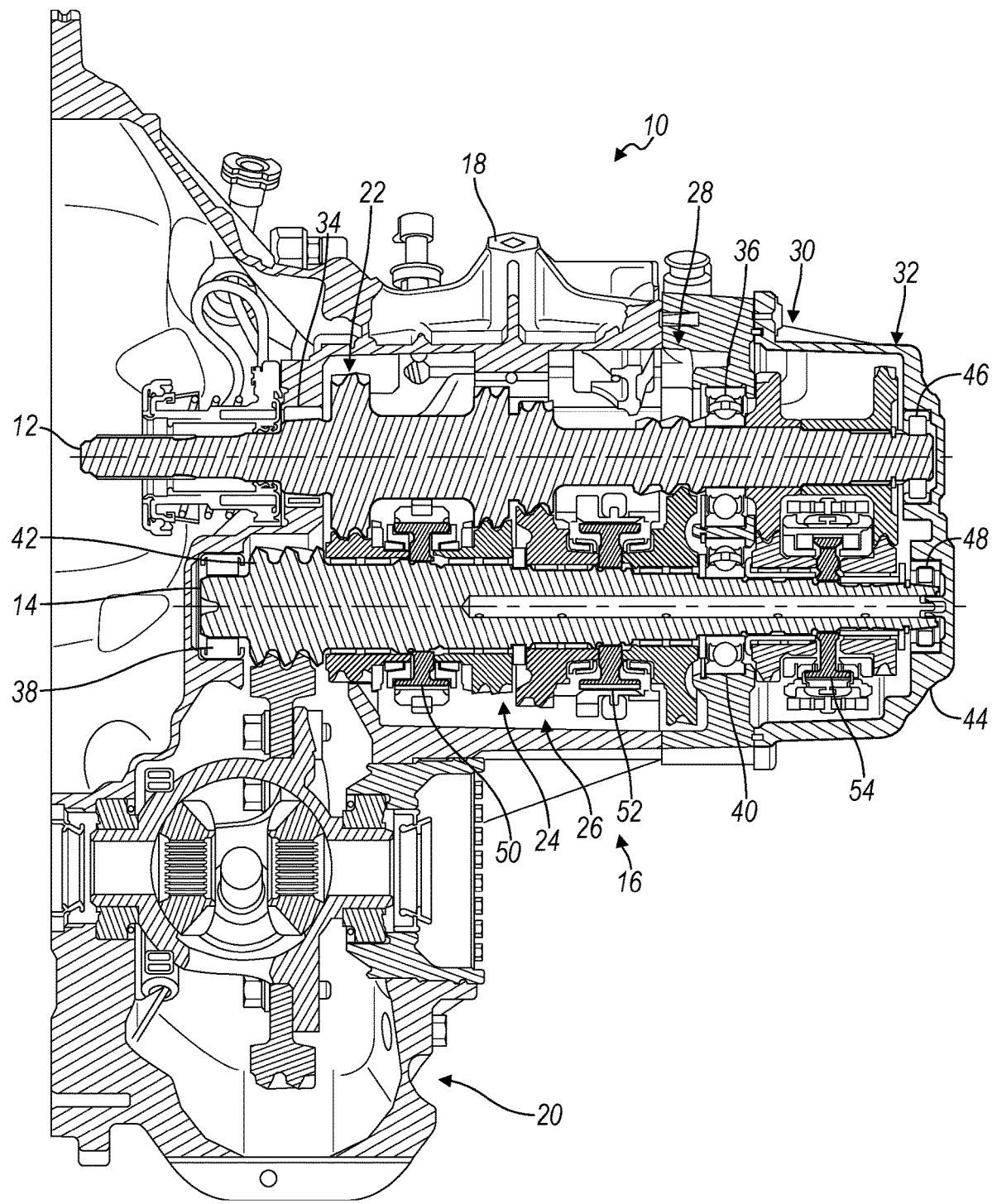
FIG. 1 is a cross sectional view of an example of a six speed manual transmission, in accordance with the present invention.
Figure 2:
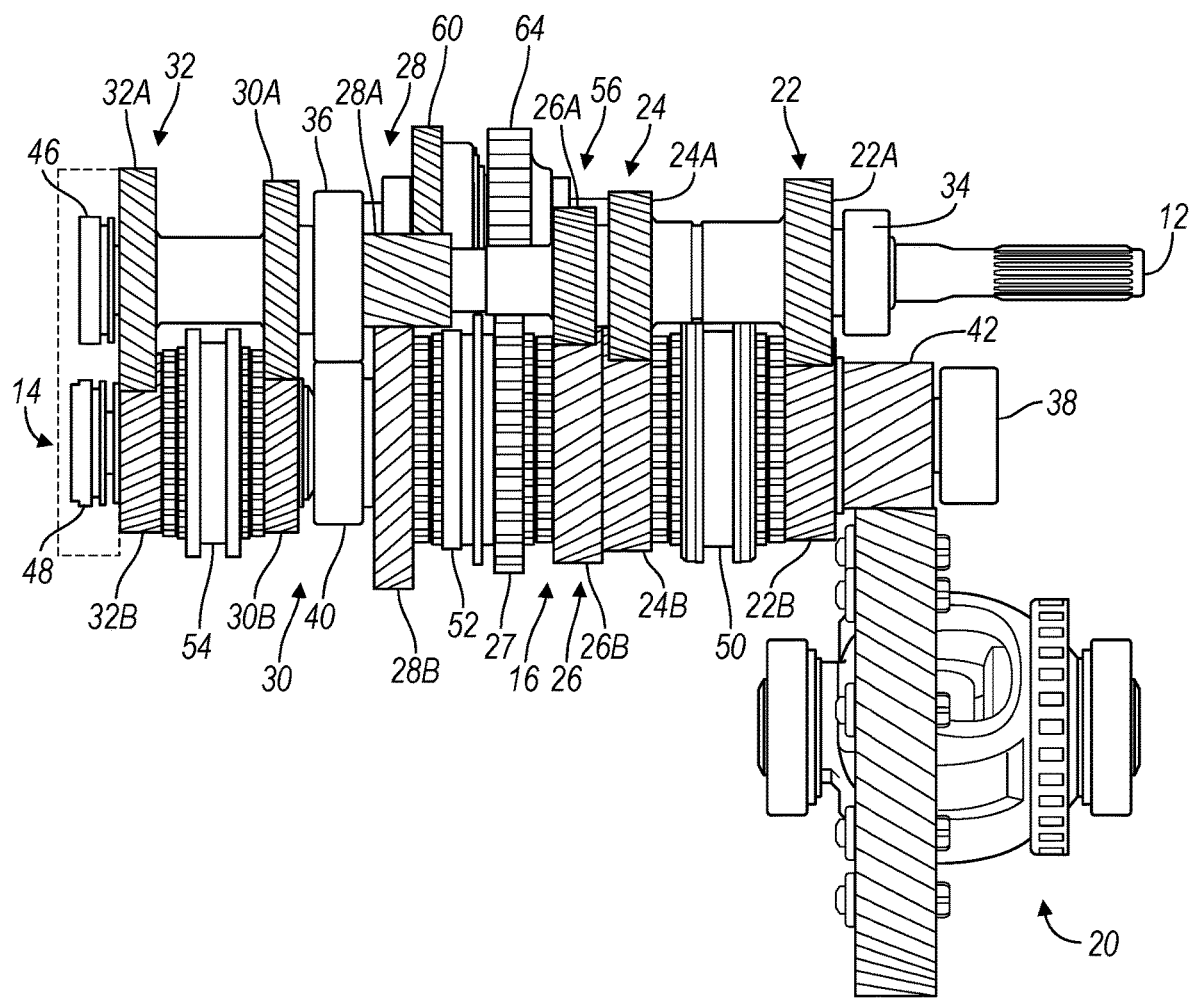
FIG. 2 is an plan view of a gear and shaft arrangement of a six speed manual transmission in accordance with the present invention.

Referring to FIGS. 1 and 2, a multiple speed manual transmission generally indicated by reference number 10 is illustrated and will now be described. The transmission 10 includes an input member or shaft 12, an output member or shaft 14, a gearing arrangement 16 at least partially enclosed by a transmission housing 18, and a structural transmission cover 44. The input member 12 is selectively connectable to an output member of an engine (not shown) through a manually activated clutch. The input member 12 may be further isolated from the output member of the engine through a flywheel or damper (not shown) to improve vibration transmission from the engine to the transmission 10. The output member 14 transfers torque to drive wheels through a differential assembly 20.

The gearing arrangement 16 includes various shafts or members, coplanar intermeshing gear sets, and selectively engageable synchronizers, as will be described herein. For example, the gearing arrangement 16 includes first, second, third, fourth, fifth, and sixth coplanar gear sets 22, 24, 26, 28, 30, 32 each having a first gear 22A, 24A, 26A, 28A, 30A, 32A and a second gear 22B, 24B, 26B, 28B, 30B, 32B. Each of the first gears 22A, 24A, 26A, 28A, 30A, 32A are fixed to the input member 12 for common rotation with the input member 12. Each of the second gears 22B, 24B, 26B, 28B, 30B, 32B are rotatably supported by and selectively connectable to the output member 14. Furthermore, the first gears 22A, 24A, 26A, 28A, 30A, 32A of each of the coplanar gear sets 22, 24, 26, 28, 30, 32 intermesh with the corresponding second gear 22B, 24B, 26B, 28B, 30B, 32B of the respective coplanar gear set 22, 24, 26, 28, 30, 32. Additionally, the gearing arrangement 16 includes an output gear 42 fixed to the output member 14 for common rotation. The output gear 42 is intermeshed with the differential housing of the differential assembly 20.

The gearing arrangement 16 further includes a plurality of synchronizer assembly for selectively connecting the second gears 22B, 24B, 26B, 28B, 30B, 32B of the coplanar gear sets 22, 24, 26, 28, 30, 32 to the output member 14 for common rotation. For example, a first synchronizer assembly 50 is disposed on the output member 14 and selectively connects one of the second gear 22B of the first coplanar gear set 22 and the second gear 24B of the second coplanar gear set 24 to the output member 14. A second synchronizer assembly 52 is disposed on the output member 14 and selectively connects one of the second gear 26B of the third coplanar gear set 26 and the second gear 28B of the fourth coplanar gear set 28 to the output member 14. A third synchronizer assembly 54 is disposed on the output member 14 and selectively connects one of the second gear 30B of the fifth coplanar gear set 30 and the second gear 32B of the sixth coplanar gear set 32 to the output member 14.

The input member 12 and output member 14 are rotatably supported in the housing 18 through a plurality of bearings. For example, the input member 12 is rotatably supported by the housing 18 through a first and second bearing 34, 36. The output member 14 is rotatably supported by the housing 18 through a third and fourth bearings 38, 40. The first bearing 34 is disposed adjacent the first coplanar gear set 22. The second bearing 36 and fourth bearing 40 are disposed between the fourth and fifth coplanar gear sets. The third bearing 38 is disposed adjacent the output gear 42. A fifth and sixth bearings 46, 48 each rotatably support an end of the input member 12 and the output member 14. The fifth bearing 46 is disposed in the transmission cover 44 and rotatably supports the end of the input member 12 adjacent to the first gear 32A of the sixth coplanar gear set 32. The sixth bearing 48 is disposed in the transmission cover 44 proximate to the fifth bearing 46, adjacent to the second gear 32B of the sixth coplanar gear set 32, and rotatably supports the end of the output member 14.

The transmission 10 also includes a reverse gear or idler mechanism 56 on an idler member or shaft 58. The reverse gear mechanism 56 includes a first gear 60 and a second gear 62. The first gear 60 is fixedly connected to the idler shaft 58 and intermeshed with the first gear 28A of the fourth coplanar gear set 28. The second gear 62 is slidingly connected to the idler shaft 58 and rotates in common with the idler shaft 58. Also, the second gear 62 is selectively manipulated to slide axially along the idler shaft 58 to intermesh with a reverse gear 27 that is fixed for common rotation with the output member 14.

Referring now to FIG. 2 with continuing reference to FIG. 1, the gear ratios of the transmission 10 are detailed and will now be described. The transmission 10 is capable of transmitting torque from the input shaft member 12 to the output member 14 in at least six forward torque ratios and at least one reverse torque ratio. Each of the forward torque ratios and the reverse torque ratio is attained by selective engagement of one or more of the synchronizer assemblies 50, 52, 54. Those skilled in the art will readily understand that a different speed ratio is associated with each torque ratio.

It should be appreciated that each individual gear set 22, 24, 26, 28, 30, 32 provides one forward gear ratio upon selective engagement of the synchronizer assemblies 50, 52, 54. However, which synchronizer and which gear set are associated with a particular forward or reverse speed ratio may vary without departing from the scope of the present invention.

To establish a first forward torque ratio (i.e. a 1st gear), input member 12 rotates the first gear 28A of the fourth coplanar gear set 28 and the second synchronizer 52 is activated to couple the second gear 28B of the fourth coplanar gear set 28 to the output member 14. More specifically, input torque from the input member 12 is transferred to the first gear 28A of the fourth coplanar gear set 28. The first gear 28A of the fourth coplanar gear set 28 transfers torque to the second gear 28B of the fourth coplanar gear set 28 which transfers the torque to the output member 14 through the second synchronizer 52, from the second synchronizer 52 to the output gear 42, and from the output gear 42 to the differential assembly 20.

To establish a second forward torque ratio (i.e. a 2nd gear), input member 12 rotates the first gear 26A of the third coplanar gear set 26 and the second synchronizer 52 is activated to couple the second gear 26B of the third coplanar gear set 26 to the output member 14. More specifically, input torque from the input member 12 is transferred to the first gear 26A of the third coplanar gear set 26. The first gear 26A of the third coplanar gear set 26 transfers torque to the second gear 26B of the third coplanar gear set 26 which transfers the torque to the output member 14 through the second synchronizer 52, from the second synchronizer 52 to the output gear 42, and from the output gear 42 to the differential assembly 20.

To establish a third forward torque ratio (i.e. a 3rd gear), input member 12 rotates the first gear 24A of the second coplanar gear set 24 and the first synchronizer 50 is activated to couple the second gear 24B of the second coplanar gear set 24 to the output member 14. More specifically, input torque from the input member 12 is transferred to the first gear 24A of the second coplanar gear set 24. The first gear 24A of the second coplanar gear set 24 transfers torque to the second gear 24B of the second coplanar gear set 24 which transfers the torque to the output member 14 through the first synchronizer 50, from the first synchronizer 50 to the output gear 42, and from the output gear 42 to the differential assembly 20.

To establish a fourth forward torque ratio (i.e. a 4*th* gear), input member 12 rotates the first gear 22A of the first coplanar gear set 22 and the first synchronizer 50 is activated to couple the second gear 22B of the first coplanar gear set 22 to the output member 14. More specifically, input torque from the input member 12 is transferred to the first gear 22A of the first coplanar gear set 22. The first gear 22A of the first coplanar gear set 22 transfers torque to the second gear 22B of the first coplanar gear set 22 which transfers the torque to the output member 14 through the first synchronizer 50, from the first synchronizer 50 to the output gear 42, and from the output gear 42 to the differential assembly 20.

To establish a fifth forward torque ratio (i.e. a 5th gear), input member 12 rotates the first gear 30A of the fifth coplanar gear set 30 and the third synchronizer 54 is activated to couple the second gear 30B of the fifth coplanar gear set 30 to the output member 14. More specifically, input torque from the input member 12 is transferred to the first gear 30A of the fifth coplanar gear set 30. The first gear 30A of the fifth coplanar gear set 30 transfers torque to the second gear 30B of the fifth coplanar gear set 30 which transfers the torque to the output member 14 through the third synchronizer 54, from third synchronizer 54 to the output gear 42, and from the output gear 42 to the differential assembly 20.

To establish a sixth forward torque ratio (i.e. a 6th gear), input member 12 rotates the first gear 32A of the sixth coplanar gear set 32 and the third synchronizer 54 is activated to couple the second gear 32B of the sixth coplanar gear set 32 to the output member 14. More specifically, input torque from the input member 12 is transferred to the first gear 32A of the sixth coplanar gear set 32. The first gear 32A of the sixth coplanar gear set 32 transfers torque to the second gear 32B of the sixth coplanar gear set 32 which transfers the torque to the output member 14 through the third synchronizer 54, from third synchronizer 54 to the output gear 42, and from the output gear 42 to the differential assembly 20.

Again, it should be appreciated that any one of the gear sets 22, 24, 26, 28, 30, 32 may be changed to produce a certain forward and reverse torque ratio without departing from the scope of the present invention.

The present invention contemplates that a variety of torque ratios (i.e., the ratio of torque of the output member 14 to the input member 12) are achievable through the selection of tooth counts of the gears of the transmission 10. This arrangement provides the opportunity to achieve reduced transmission length in comparison with other transmissions.

Figure 3:
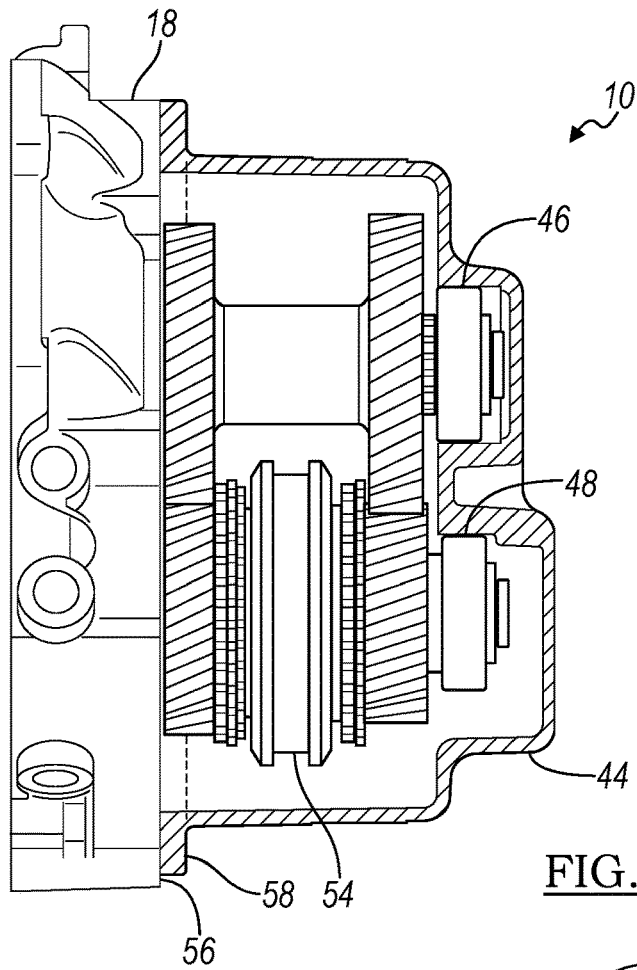
FIG. 3 is a partial plan view of a manual transmission in accordance with the present invention.

Referring now to FIG. 3, a portion of the transmission 10 of the present invention is illustrated and will now be described. The transmission housing 18 further includes a mounting or sealing flange 56. Additionally, the transmission cover 44 includes a mounting or sealing flange 58 that is sealingly connected to the sealing flange 56 of the transmission housing 18. The fifth and sixth coplanar gear sets 30, 32, the fifth and sixth bearings 46, 48, and the third synchronizer assembly 54 are contained in the transmission cover 44.

Figure 4:
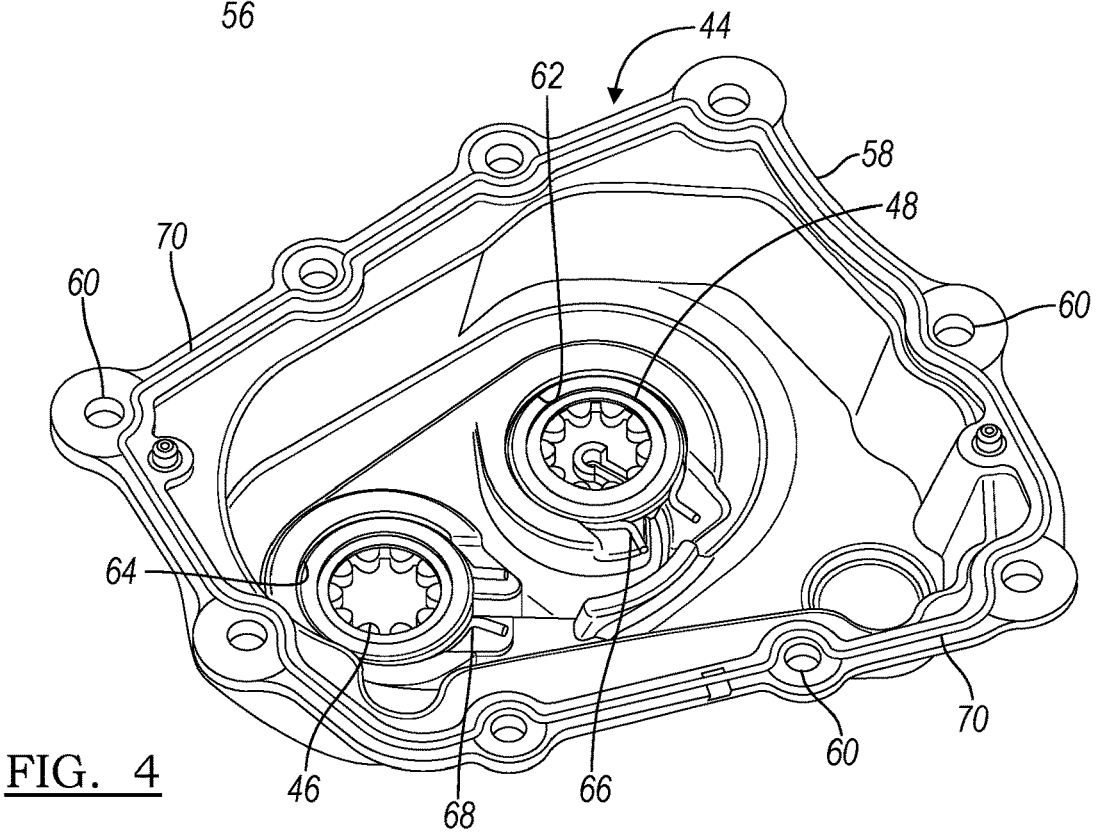
FIG. 4 is a perspective view of a cover of a manual transmission in accordance with the present invention.

Turning now to FIG. 4, the transmission cover 44 of the transmission 10 is illustrated and will now be described. The transmission cover 44 includes a plurality of fastener bosses 60, a seal groove and seal 70 and a first and second bearing support portions 62, 64. The fifth and sixth bearings 46, 48 are disposed in the first and second bearing support portions 62, 64, respectively. The fifth and sixth bearings 46, 48 are retained in the first and second bearing support portions 62, 64 by a first and second retainer rings 66, 68. During assembly of the transmission 10, the fifth and sixth bearings 46, 48 are installed in the transmission cover 44 prior to fastening the sealing flange 58 of the transmission cover 44 to the sealing flange 56 of the transmission housing 18. The transmission cover 44 is formed from a structural alloy such as cast aluminum, stamped steel, or other structural material to provide structural support for a portion of the gearing arrangement 16 that extends beyond the sealing flange 56 of the transmission housing.

Figure 5:
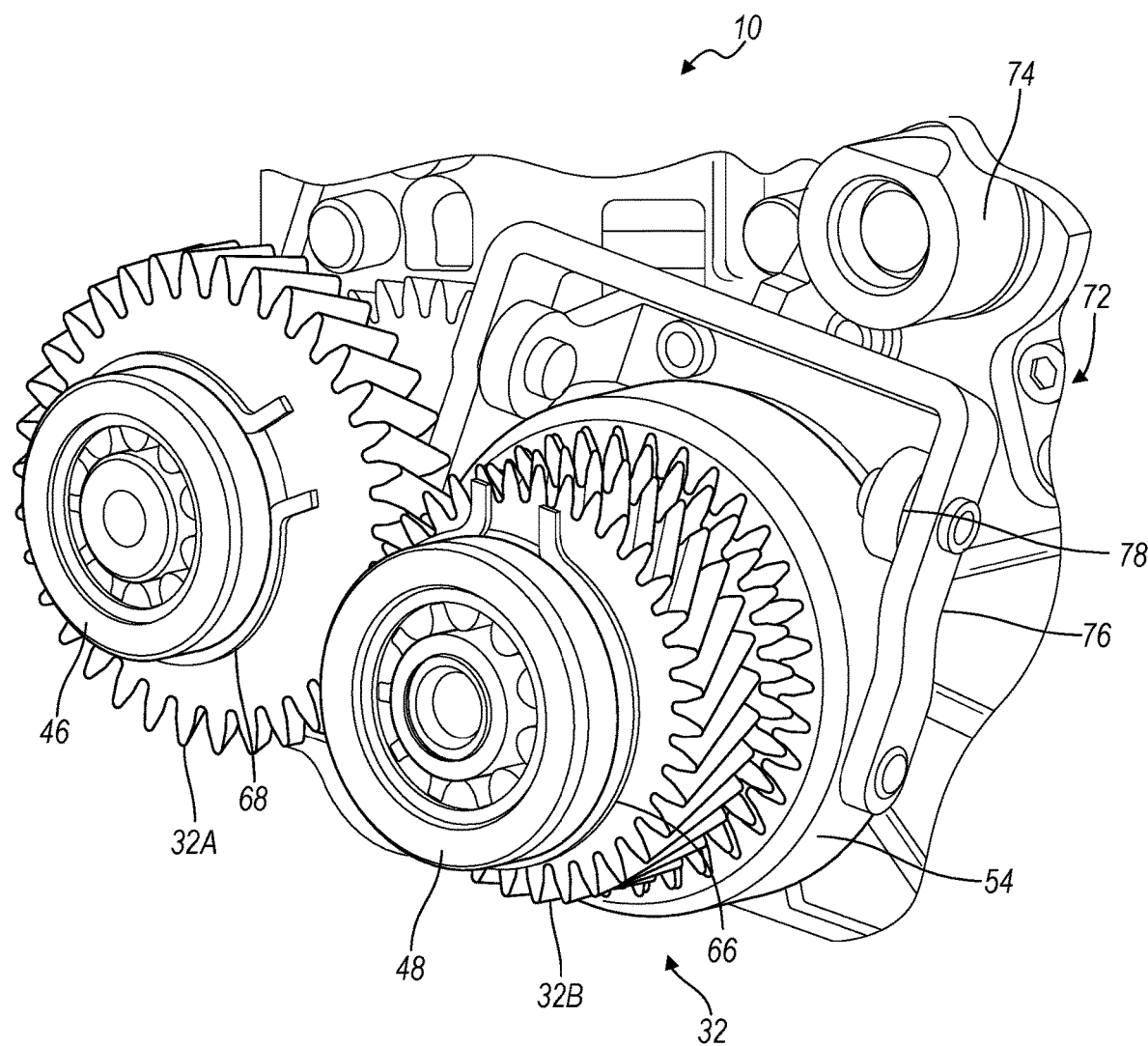
FIG. 5 is a perspective view of a portion of the gear and shaft arrangement of a six speed manual transmission in accordance with the present invention.

Referring now to FIG. 5, a portion of the gearing arrangement 16 of the transmission 10 is illustrated and will now be described. The transmission 10 further includes a synchronizer shifting mechanism 72 including a shift rod 74 and a shift fork 76 for manipulating the third synchronizer assembly 54. The shift fork 76 is pivotably mounted to the mounting flange 56 of the transmission housing 18 via a bracket 78. This portion of the transmission is shown without the transmission cover 44 yet includes the fifth and sixth bearings 46, 48 and the first and second retainer rings 66, 68.

While the best modes for carrying out the invention have been described in detail, those familiar with the art to which this invention relates will recognize various alternative designs and examples for practicing the invention within the scope of the appended claims.

I claim:

1. A manual transmission, the transmission comprising:
an input member;
an output member, and wherein the output member is parallel to the input member;
six coplanar gear sets each having a first gear intermeshing with a second gear, and wherein each of the first gears of the six coplanar gear sets are fixed for common rotation with the input member and each of the second gears of the six coplanar gear sets are selectively coupled to the output member;
a first two-way synchronizer for selectively connecting one of the second gear of the first coplanar gear set and the second gear of the second coplanar gear set with the output member;
a second two-way synchronizer for selectively connecting one of the second gear of the third coplanar gear set and the second gear of the fourth coplanar gear set with the output member;
a third two-way synchronizer for selectively connecting one of the second gear of the fifth coplanar gear set and the second gear of the sixth coplanar gear set with the output member, and a transmission housing at least partially supporting the input and output members;
a structural transmission cover fixed to the transmission housing, and wherein the structural transmission cover includes a first bearing and a second bearing, the first bearing is retained in the structural transmission cover by a first retainer ring prior to assembling the cover to the housing, the second bearing is retained in the structural transmission cover by a second retainer ring prior to assembling the cover to the housing, the first end of the input member is rotatably supported by the first bearing, and the first end of the output member is rotatably supported by the second bearing; and wherein one of the first, second, and third two-way synchronizers is activated to connect one of the second gears of the six coplanar gear sets for common rotation with the output member to achieve one of six forward gear ratios;

wherein the input member and output member each have a middle portion and a second end, the second end of the each of the input member and the output member is rotatably supported by the transmission housing;

wherein the transmission housing rotatably supports the second end of the input member via a third bearing, the second end of the output member via a fourth bearing, the middle portion of the input member via a fifth bearing, and the middle portion of the output member via a sixth bearing;

wherein the selective engagement of the second gears of the first, second, third, and fourth coplanar gear sets provide the first, second, third, and fourth forward gear ratios and each of the first, second, third, and fourth coplanar gear sets are enclosed by the transmission housing; and wherein the selective engagement of the second gears of the fifth and sixth coplanar gear sets provide the fifth and sixth forward gear ratios and each of the fifth and sixth coplanar gear sets are enclosed by the structural transmission cover.

2. The manual transmission of claim 1 wherein the fourth coplanar gear set is disposed proximate the first end of the input and output members and the first coplanar gear set is disposed proximate the middle portion of the input and output members.

3. The manual transmission of claim 1 wherein the transmission housing includes a mounting flange, and wherein the mounting flange supports the fifth and sixth bearings, and the fifth coplanar gear set is disposed adjacent to the mounting flange.

4. The manual transmission of claim 3 wherein the structural transmission cover includes a seal groove, a plurality of fastener bosses, and a first and second bearing support portions, and wherein the first and second bearings are disposed in the first and second bearing support portions, respectively.

5. The manual transmission of claim 4 further including a synchronizer shift mechanism having a shift rod and a shift fork, and wherein the synchronizer shift mechanism activates the third two-way synchronizer, and the shift fork includes a pivot bracket mounted to the mounting flange of the transmission housing.

* * * * *